US012365453B2

(12) United States Patent
Thompson et al.

(10) Patent No.: US 12,365,453 B2
(45) Date of Patent: Jul. 22, 2025

(54) MULTI-MATERIAL DUCTED ROTOR BLADE TIP EXTENSION

(71) Applicant: Textron Innovations Inc., Fort Worth, TX (US)

(72) Inventors: George Matthew Thompson, Lewisville, TX (US); Jonathan Andrew Knoll, Burleson, TX (US); Robert Glenn Vaughn, Keller, TX (US); William Anthony Amante, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 917 days.

(21) Appl. No.: 17/229,831

(22) Filed: Apr. 13, 2021

(65) Prior Publication Data
US 2021/0354814 A1 Nov. 18, 2021

Related U.S. Application Data

(63) Continuation-in-part of application No. 16/159,208, filed on Oct. 12, 2018, now Pat. No. 11,286,037.

(51) Int. Cl.
B64C 27/473 (2006.01)
B29C 45/16 (2006.01)
(Continued)

(52) U.S. Cl.
CPC ............ B64C 27/473 (2013.01); B29C 45/16 (2013.01); B64U 30/26 (2023.01); B64U 30/29 (2023.01);
(Continued)

(58) Field of Classification Search
CPC ..... B64C 11/001; B64C 11/18; B64C 23/069; B64C 27/20; B64C 27/463;
(Continued)

(56) References Cited

U.S. PATENT DOCUMENTS 3,117,716 A 1/1964 Wernicke
3,127,093 A 3/1964 Sudrow
(Continued)

FOREIGN PATENT DOCUMENTS

EP 2112330 A2 10/2009
EP 2607628 A2 6/2013
(Continued)

OTHER PUBLICATIONS

U.S. Appl. No. 16/900,543, filed Jun. 12, 2020, Timothy Brian Carr.
(Continued)

Primary Examiner — Joshua J Michener
Assistant Examiner — Michael B. Kreiner
(74) Attorney, Agent, or Firm — Akona IP PC

(57) ABSTRACT

A rotor system is provided in one example embodiment and may include a rotor duct; at least one rotor blade, wherein the at least one rotor blade comprises a tip end; and a multi-material tip extension affixed at the tip end of the at least one rotor blade, wherein the multi-material tip extension comprises an inboard portion fabricated from a first material and an outboard portion fabricated from a second material, wherein the second material is different than the first material.

16 Claims, 12 Drawing Sheets

(51) Int. Cl.
  *B64U 30/26* (2023.01)
  *B64U 30/29* (2023.01)
  *B64U 10/20* (2023.01)

(52) U.S. Cl.
  CPC ...... *B64C 2027/4736* (2013.01); *B64U 10/20* (2023.01)

(58) Field of Classification Search
  CPC ........... B64C 2201/162; B64C 2230/28; F04D 29/325; F04D 29/38; F04D 29/382
  See application file for complete search history.

(56) References Cited

U.S. PATENT DOCUMENTS

| | | | |
|---|---|---|---|
| 3,680,977 | A | 8/1972 | Rabouyt et al. |
| 4,531,362 | A | 7/1985 | Barry et al. |
| 5,462,408 | A | 10/1995 | Coffy |
| 5,752,802 | A | 5/1998 | Jones |
| 6,206,642 | B1 | 3/2001 | Matheny et al. |
| 6,464,166 | B1 | 10/2002 | Yoeli |
| 6,561,456 | B1 | 5/2003 | Devine |
| 7,549,841 | B1 | 6/2009 | Marussich |
| 7,850,116 | B2 | 12/2010 | Stuhr |
| 8,540,487 | B2 * | 9/2013 | Bottome ............. F01D 11/16 416/174 |
| 8,777,572 | B2 | 7/2014 | Cheong et al. |
| 8,899,938 | B2 | 12/2014 | Enthammer |
| 2007/0231128 | A1 | 10/2007 | Callas |
| 2011/0164962 | A1 | 7/2011 | Wilson, Jr. et al. |
| 2012/0195767 | A1 | 8/2012 | Gervais et al. |
| 2014/0064937 | A1 | 3/2014 | Kray et al. |
| 2014/0255201 | A1 | 9/2014 | Sutton et al. |
| 2016/0177745 | A1 | 6/2016 | Uskert et al. |
| 2016/0207623 | A1 | 7/2016 | Carson |
| 2020/0115035 | A1 | 4/2020 | Groninga et al. |
| 2020/0115036 | A1 | 4/2020 | Vaughn et al. |

FOREIGN PATENT DOCUMENTS

| | | |
|---|---|---|
| EP | 3636542 A1 | 4/2020 |
| JP | 2001097288 A | 4/2001 |
| WO | 199001002 | 2/1990 |
| WO | 2014003968 A1 | 1/2014 |
| WO | 2014096839 A1 | 6/2014 |

OTHER PUBLICATIONS

EPO Examination Report issued in EP Patent Application No. 19156604.1 dated Jan. 18, 2021, 5 pages.
EPO Examination Report issued in EP Patent Application No. 19156604. 1 dated Aug. 20, 2020, 4 pages.
EPO Examination Report issued in EP Patent Application No. 19156604.1 dated Aug. 13, 2019, 5 pages.
EPO Examination Report issued in EP Patent Application No. 19156604.1 dated Jan. 3, 2020, 4 pages.
EPO Examination Report issued in EP Patent Application No. 19156604.1 dated Mar. 16, 2020, 4 pages.
EPO Search Report issued in EP Patent Application No. 19156604.1 dated Jul. 17, 2019, 4 pages.
J-PLATPAT, Patent & Utility Model No. Search, Jp 2001-097288A Drawings, retrieved and printed Aug. 8, 2018, 12 pages.
USPTO Non-Final Office Action for U.S. Appl. No. 16/159,178 mailed on Mar. 18, 2021.
USPTO Non-Final Office Action for U.S. Appl. No. 16/159,208 mailed on Mar. 18, 2021.
EPO Examination Report issued in EP Patent Application No. 19156604.1 dated Jun. 4, 2021, 6 pages.
EPO Examination Report issued in EP Patent Application No. 19156604.1 dated Oct. 18, 2021, 4 pages.

* cited by examiner

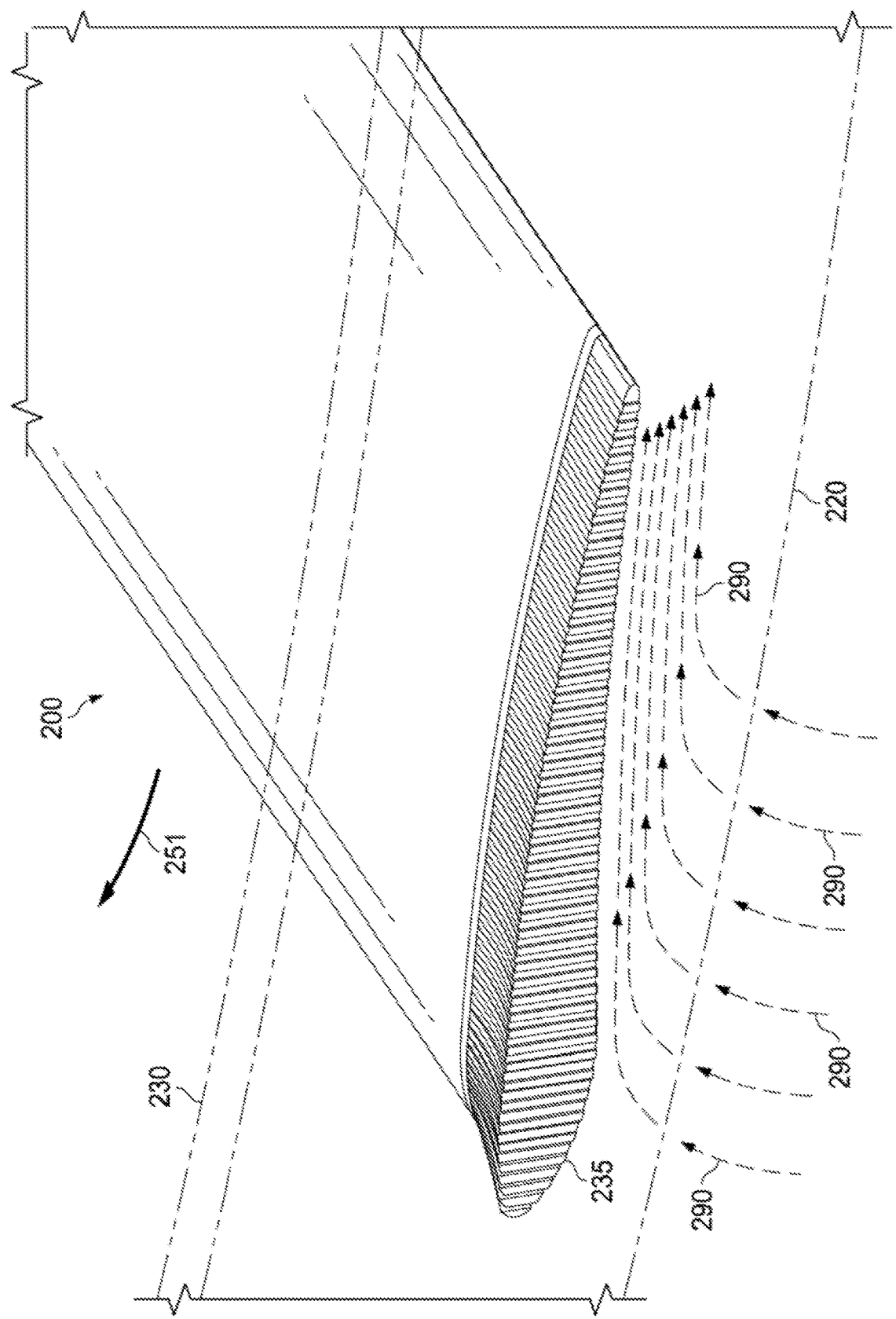

MULTI-MATERIAL DUCTED ROTOR BLADE TIP EXTENSION

CROSS-REFERENCE TO RELATED APPLICATION

This application is a continuation-in-part and claims the benefit of priority under 35 U.S.C. § 120 of U.S. patent application Ser. No. 16/159,208, filed on Oct. 12, 2018, entitled "DUCTED ROTOR BLADE TIP EXTENSION." The disclosure of the prior application is considered part of and is incorporated by reference in its entirety into the present disclosure.

TECHNICAL FIELD

This disclosure relates in general to the field of aircraft and, more particularly, though not exclusively, to multi-material rotor blade tip extensions for ducted rotor systems.

BACKGROUND

There are numerous considerations involved in the design of aircraft, such as rotorcraft, including size, weight, power efficiency, fuel efficiency, noise, vibration, structural loads, and so forth. In many cases, however, it may be challenging to improve certain aspects of an aircraft without disrupting other aspects. For example, rotor blade design for aircraft rotor systems, such as ducted rotor systems, can implicate numerous performance considerations and is often an extremely challenging aspect of aircraft design.

SUMMARY

One embodiment is a rotor system including a rotor duct; at least one rotor blade, wherein the at least one rotor blade comprises a tip end; and a multi-material tip extension affixed at the tip end of the at least one rotor blade, wherein the multi-material tip extension comprises an inboard portion fabricated from a first material and an outboard portion fabricated from a second material, wherein the second material is different than the first material.

Another embodiment is an aircraft comprising a fuselage; and at least one rotor system, the at least one rotor system comprising a rotor duct; at least one rotor blade, wherein the at least one rotor blade comprises a tip end; and a multi-material tip extension affixed at the tip end of the at least one rotor blade, wherein the multi-material tip extension comprises an inboard portion fabricated from a first material and an outboard portion fabricated from a second material, wherein the second material is different than the first material.

Yet another embodiment is a method comprising providing a mold, wherein the mold comprises a cavity and the cavity has a shape that matches an outer mold line of a rotor blade; providing a first material in a bottom of the cavity, the first material comprising a first portion of a unitary blade tip extension for the rotor blade; and injecting a second material into the cavity on top of the first material to form a second portion of the unitary blade tip extension for the rotor blade.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 2A-2D are simplified diagrams illustrating example details that may be associated with a multi-material tip extension for a ducted rotor blade, in accordance with certain embodiments.

DETAILED DESCRIPTION

Figure 1:
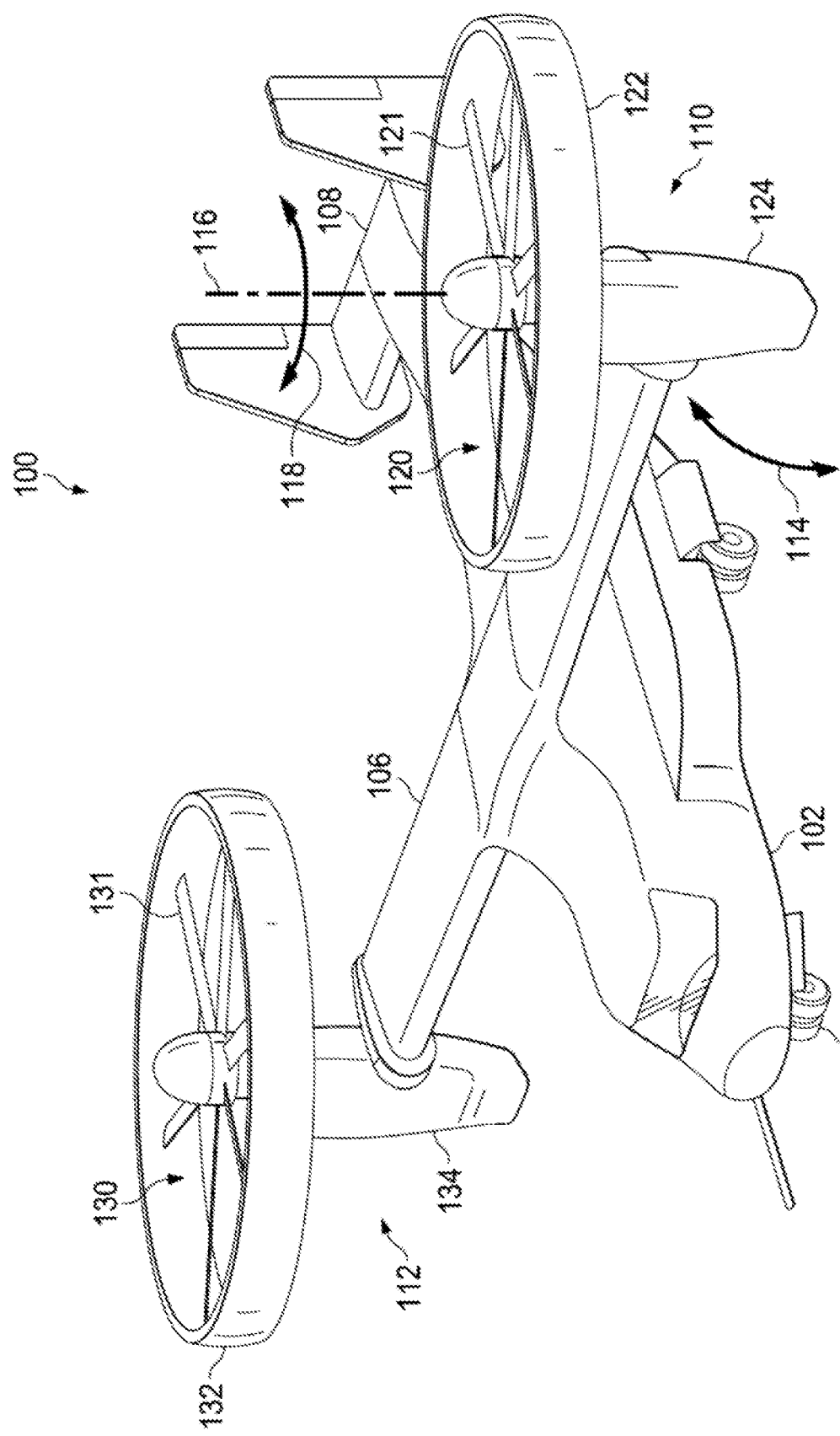
FIG. 1 is a simplified diagram of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect (s). The term 'inboard' may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term 'outboard' may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Referring to FIG. 1, FIG. 1 illustrates an example embodiment of an example aircraft, which, in this example is a vertical take-off and landing (VTOL) aircraft 100, in accordance with certain embodiments. FIG. 1 portrays a perspective view of VTOL aircraft 100. In at least one embodiment, VTOL aircraft 100 may include a fuselage 102, a landing gear 104, a wing 106, a tail member 108, a ducted rotor system 110, and a ducted rotor system 112. The fuselage 102 is the main body of VTOL aircraft 100, which may include a cabin (e.g., for crew, passengers, and/or cargo) and/or may house certain mechanical and electrical components for VTOL aircraft 100. In the illustrated embodiment, tail member 108 may be used as a vertical and a horizontal stabilizer.

Ducted rotor system 110 includes a proprotor 120, a rotor duct 122, and a nacelle 124. Proprotor 120 includes a plurality of rotor blades 121. Ducted rotor system 112 includes a proprotor 130, a rotor duct 132, and a nacelle 134. Proprotor 130 includes a plurality of rotor blades 131. The position of proprotors 120 and 130, as well as the pitch of rotor blades 121 and 131, can be selectively controlled in order to provide flight capabilities (e.g., flight direction, thrust, and/or lift) for VTOL aircraft 100.

The position of proprotors 120 and 130 are moveable (as generally indicated by arrows 114) between a helicopter mode position and an airplane mode position to provide different types of thrust for tiltrotor aircraft 100. FIG. 1 illustrates tiltrotor aircraft 100 proprotors 120 and 130 in a helicopter mode position in which proprotors 120 and 130 are positioned substantially vertical to provide a lifting thrust. For an airplane mode position, proprotors 120 and 130 can be positioned substantially horizontal to provide a forward thrust in which a lifting force is supplied by wing 106. It should be appreciated that tiltrotor aircraft can be operated such that proprotors 120 and 130 can be selectively positioned between airplane mode and helicopter mode positions, which can be referred to as a 'conversion mode', 'conversion mode positioning', or variations thereof.

Ducted rotor systems 110 and 112 are illustrated in the context of VTOL aircraft 100; however, ducted rotor systems 110 and 112 can be implemented on other VTOL aircraft. For example, an alternative embodiment may include a multi-ducted rotor system VTOL aircraft that has an additional wing member aft of wing 106 and the additional wing member may have additional ducted rotor systems similar to ducted rotor systems 110 and 112. In another embodiment, ducted rotor systems 110 and 112 can be used with an unmanned version of VTOL aircraft 100. Further, ducted rotor systems 110 and 112 can be integrated into a variety of aircraft configurations. In still some embodiments, a ducted rotor system may be provided for a tail member of an aircraft. One example of a ducted rotor system that may be provided for an aircraft tail member may be a Fenestron in which a duct and rotor blades are provided within the tail member.

Various engine(s), gearbox(es), and drive shaft(s) may be provided in various configurations to provide torque to proprotors 120 and 130 (e.g., via nacelles 124 and 134). Respective rotor ducts 122 and 132 can be structurally secured to respective nacelles 124 and 134 using any suitable techniques. Rotor ducts 122 and 132 may extend vertically beyond top sides and bottom sides of rotor blades 121 and 131.

In various embodiments, the pitch of rotor blades 121 and 131 can be managed and/or adjusted using collective control and/or cyclic control to selectively control direction, thrust, and/or lift of VTOL aircraft 100. During collective control, all of the rotor blades are collectively pitched together (e.g., the pitch angle is the same for all blades). During cyclic control, the pitch angle of each of the rotor blades varies depending on where each blade is within a cycle of rotation (e.g., at some points in the rotation of rotor blades about the rotational axis of the rotor mast the pitch angle is not the same for all blades), which can effect direction of travel. A rotational axis (generally indicated by dashed lines 116) of the rotor mast associated with proprotor 120 is illustrated in the embodiment of FIG. 1 in which rotor blades 121 can be rotated (as generally indicated by arrows 118) about the rotational axis 116 during operation of ducted rotor system 110. Ducted rotor system 112 may be operated in a similar manner as ducted rotor system 110.

In general, a ducted rotor system can provide improved thrust than a non-ducted rotor systems for the same power and rotor size. For example, the power needed to rotate ducted rotor blades to achieve a certain thrust may be reduced for ducted rotor systems in comparison to non-ducted rotor systems of the same size. Ducted rotor systems also provide an acoustic advantage over non-ducted rotor systems. In a ducted rotor system, the tip end of rotor blades is configured to be in close proximity to the inner face of the rotor duct. A small gap or clearance distance is typically configured between the tip end of the rotor blades and the inner face of a rotor duct. Benefits of ducted rotor systems can be realized (e.g., power reduction realized to achieve a given thrust) based on the ratio between the clearance distance and the chord length of the rotor blades. Stated differently, for a constant power input to a ducted rotor system (from an engine), thrust can be increased as the clearance distance to chord length ratio is decreased.

In order for a ducted rotor system to be effective (e.g., to realize its benefits), it is desirable to tightly control tip clearance distance between the rotor blades and the rotor duct inner face. Due to manufacturing and/or assembly tolerances as well as operational and/or aerodynamic loads and/or forces that an aircraft may be subjected to during operation (e.g., lift, drag, centrifugal forces, aerodynamic shears, and so forth) it can be difficult to maintain a constant tight clearance distance between rotating ducted rotor blades and a fixed rotor duct.

The present disclosure describes various embodiments for providing multi-material rotor blade tip extensions comprising a unitary tip extension made of two or more materials, resulting in a part that is structural (or stiff) at the inboard end and compliant (or flexible) at the outboard end. The inboard end of the multi-material tip extension can be attached to the outboard tip of a rotor blade of a ducted rotor system to provide a fixed extended length for the blade. The multi-material tip extensions may have the same overall shape or contour as the rotor blades to which they are affixed thereby providing for the ability to extend the overall length of the rotor blades such that the clearance distance between the rotor blades and the inner face of the rotor duct may be minimized for a particular implementation and/or application. Tip extensions may include flexible elements provided along the compliant (outboard) end. The flexible elements may increase flexibility of tip extensions to provide relief in the direction of motion of rotor blades for any unintended contact that may occur between the tip extensions and the inner face of the rotor duct during operation. Different configurations may be provided for the multi-material unitary tip extensions in accordance with various embodiments, as discussed in further detail herein.

Example embodiments associated with providing unitary multi-material unitary tip extensions for ducted rotor blades are described below with more particular reference to the remaining FIGURES. It should be appreciated that example VTOL aircraft 100 of FIG. 1 is merely illustrative of a variety of aircraft in which unitary multi-material tip extensions for ducted rotor blades may be used in accordance with embodiments of the present disclosure. Other aircraft in which unitary multi-material ducted rotor blade tip extensions may be used can include, for example, fixed wing airplanes, hybrid aircraft, unmanned aircraft, a variety of helicopter configurations, and drones, among other examples.

Figure 2A:
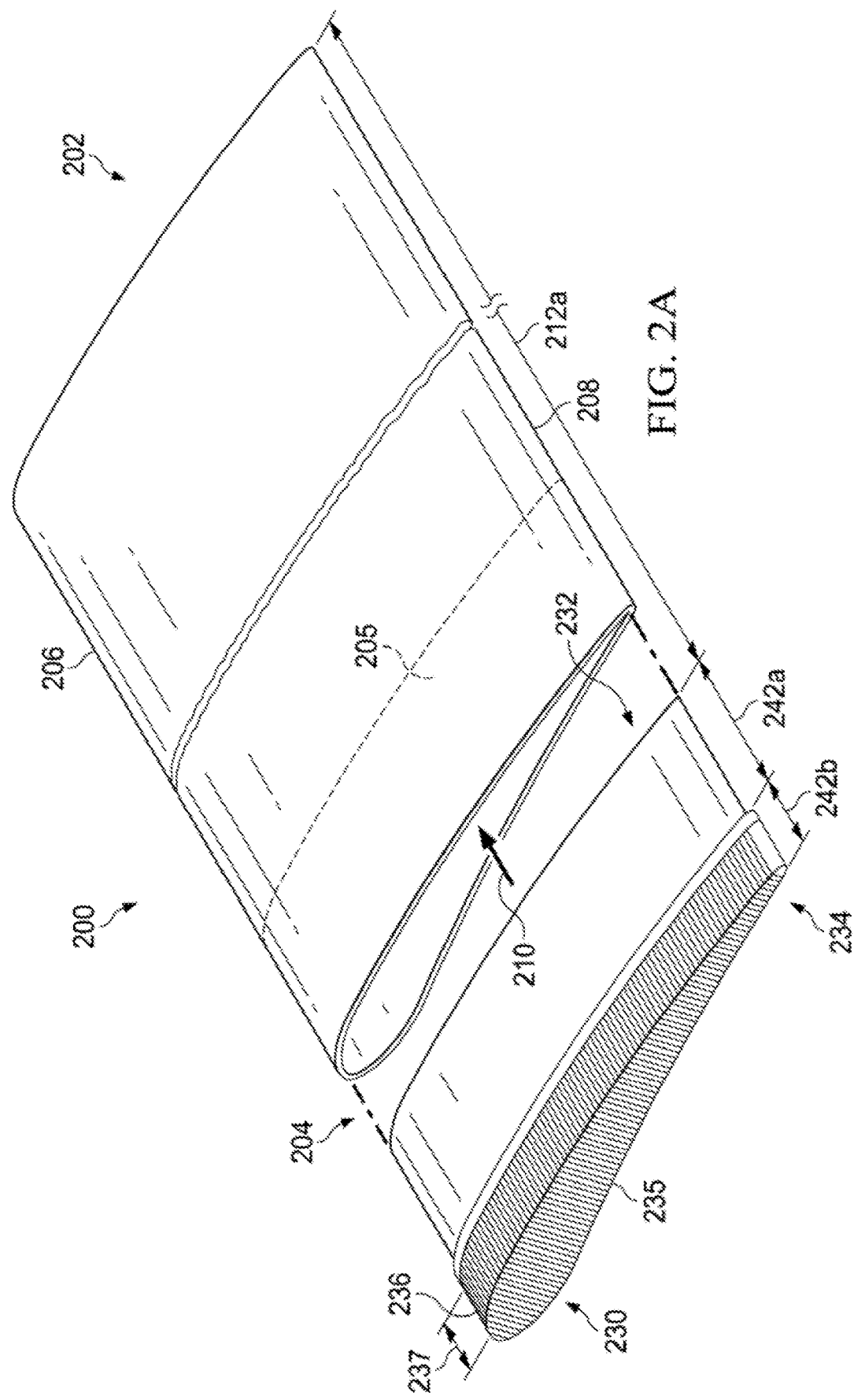
Figure 2B:
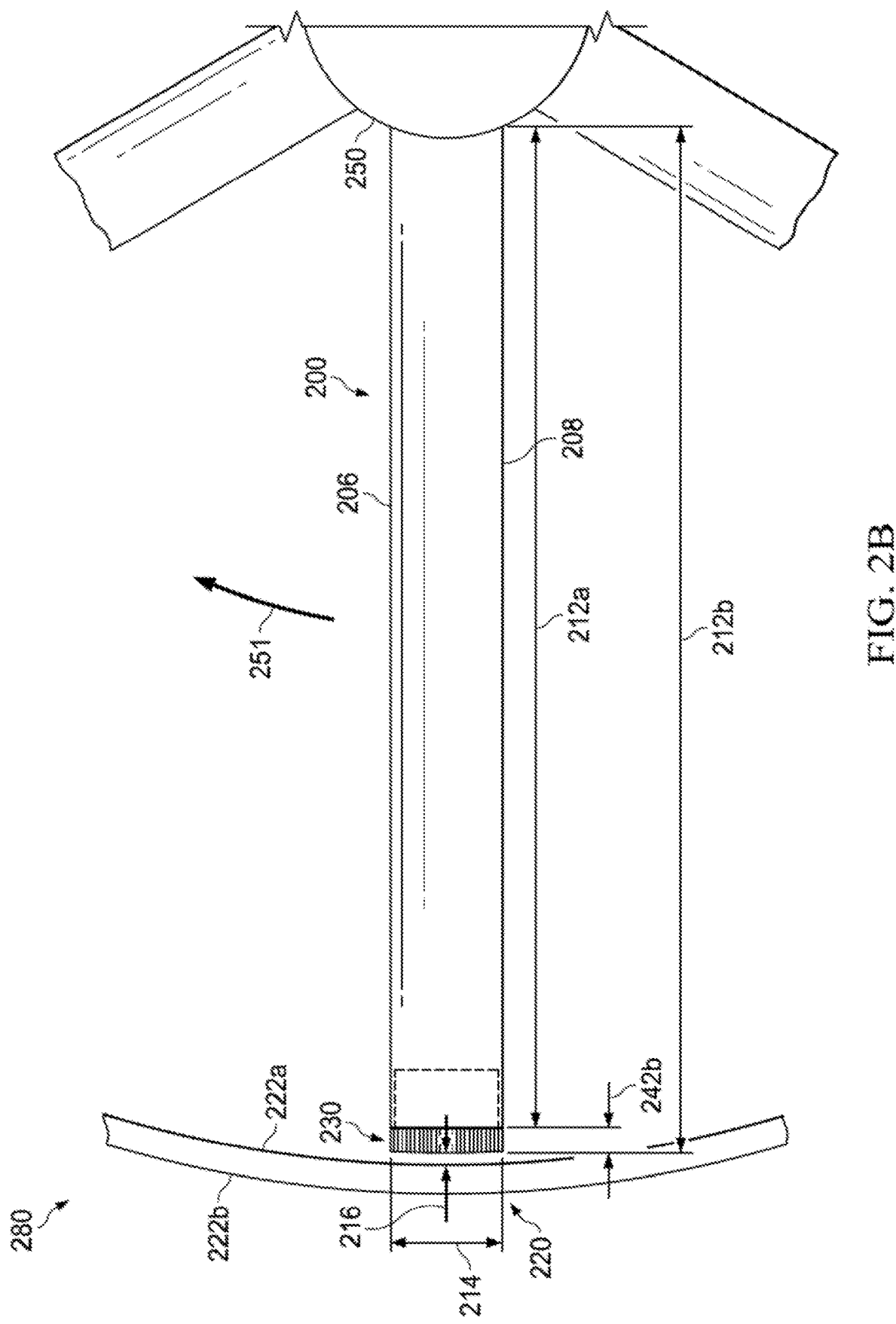
Figure 2C:
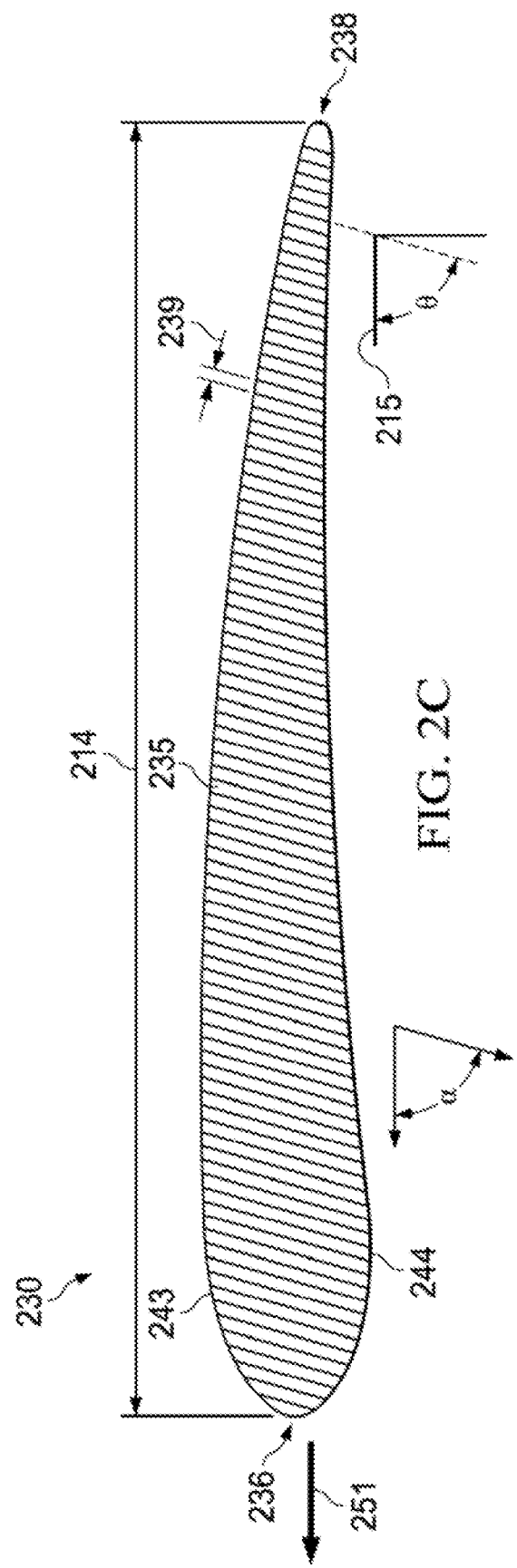

FIGS. 2A-2D are simplified diagrams illustrating example details that may be associated with a multi-material tip extension 230 for a ducted rotor blade 200, in accordance with certain embodiments. In particular, FIG. 2A is a simplified perspective view diagram illustrating example details that may be associated with multi-material tip extension 230 and ducted rotor blade 200, in accordance with certain embodiments. FIG. 2B is a simplified top view diagram illustrating example details that may be associated with a ducted rotor system 280 in which ducted rotor blade 200 including multi-material tip extension 230 may be utilized, in accordance with certain embodiments. FIG. 2C is a simplified side view diagram illustrating other example details that may be associated with multi-material tip extension 230, in accordance with certain embodiments. FIG. 2D is a simplified top view diagram illustrating example details that may be associated with an example use case scenario that may occur during operation of ducted rotor blade 200, in accordance with certain embodiments. Discussions associated with multi-material tip extension 230, ducted rotor blade 200, and/or rotor duct 220 may make simultaneous reference to FIGS. 2A-2D.

As illustrated in the embodiment of FIG. 2A, ducted rotor blade 200 may include an inboard end 202 (sometimes referred to as the root or root end), an outboard end 204 (also referred to interchangeably herein as "tip end" 204), a leading edge 206, and a trailing edge 208. Although not illustrated for the embodiment of FIG. 2A, it is to be understood that inboard end 202 may include attachment features for attaching ducted rotor blade 200 to a rotor hub for a given ducted rotor system (e.g., rotor hub 250 for ducted rotor system 280 illustrated in FIG. 2B). Multi-material tip extension 230 may include an inboard end 232, an outboard end 234, a leading edge 236, and a trailing edge 238. A plurality of flexible elements 235 may be provided for outboard end 234 of multi-material tip extension 230. Rotor blade 200 may have a fixed non-extended length 212a as measured between the inboard end 202 and the tip end 204. Rotor blade 200 may have a chord length 214 (FIG. 2B).

A multi-material tip extension may be affixed to a rotor blade tip end using any suitable technique in order to provide a fixed attachment between the multi-material tip extension and the tip end of the rotor blade such that a fixed extended length may be provided for the ducted rotor blade when the multi-material tip extension is affixed thereto. For example, in at least one embodiment, tip end 204 of ducted rotor blade 200 may include a hollow cavity 205 in which the inboard end 232 of multi-material tip extension 230 may be inserted (generally illustrated by arrow 210) to mechanically affix multi-material tip extension 230 to ducted rotor blade 200, as illustrated at least in FIG. 2B. In at least one embodiment, inboard end 232 of multi-material tip extension 230 may be suitably sized to provide a friction fit mechanical attachment between the inboard end 232 of multi-material tip extension 230 and tip end 204 of ducted rotor blade 200. In some embodiments, an adhesive (e.g., silicone, epoxy, or other adhesive) may be used to facilitate mechanical attachment between multi-material tip extension 230 and the tip end 204 of ducted rotor blade 200 in addition to or in lieu of a friction fit mechanical attachment between the components.

Other techniques may be used to provide mechanical attachment between a multi-material tip extension and a given rotor blade. For example, in some embodiments, the tip end of a rotor blade may be suitably sized to be inserted into a hollow inboard end of a multi-material tip extension in order to mechanically affix the multi-material tip extension to the rotor blade. In still some embodiments, one or more attachment element(s) (e.g., stud(s), slot(s), bolt(s), clip(s), complimentary mating elements (e.g., slot/tab, tongue/groove, etc.) etc.) may be provided for a rotor blade tip end and one or more mating attachment element(s) may be provided for a multi-material tip extension inboard end in order to mechanically affix the multi-material tip extension to the rotor blade.

In accordance with features of embodiments describe herein, multi-material tip extension 230 is fabricated as a unitary part, wherein inboard end 232 is made of structural (e.g., rigid) material and outboard end 234, including flexible elements 235, is made of compliant (e.g., flexible) material. In various embodiments, inboard end 232 may be made, at least in part, of (and the term "structural material" may include one or more of) composite materials, reinforced composite materials (e.g., carbon fiber reinforced polymers), fiberglass, reinforced fiberglass, plastics, reinforced plastics, metals, metal alloys, combinations thereof, or the like. In various embodiments, outboard end 234 may be made, at least in part, of (and the term "compliant material" may include one or more of) an elastomer, such as silicon rubber, nylon, polyester, polypropylene, or any other flexible material, which may accommodate elastic deformation of the flexible elements 235. In general, silicon rubber is cheap, easy to manufacture, resistant to many chemicals, can be made to have high temperature resistance, and/or may be resistant to abrasion. Other elastomers having similar properties (e.g., soft, malleable, etc.) may be utilized in accordance with embodiments herein.

FIG. 2B illustrates a portion of a ducted rotor system 280 in which ducted rotor blade 200 including multi-material tip extension 230 may be utilized in at least one embodiment. In particular, FIG. 2B illustrates a portion of a rotor duct 220 relative to ducted rotor blade 200 having multi-material tip extension 230 attached thereto. A portion of a rotor hub 250 to which ducted rotor blade 200 may be mechanically attached for ducted rotor system 280 is also illustrated in FIG. 2B. Rotor duct 220 may include an inner face 222*a* and an outer face 222*b*. During operation, ducted rotor blade 200 may be rotated (as generally indicated by arrow 251) around an axis of rotation of a rotor mast (not shown) mechanically coupled to rotor hub 250.

Multi-material tip extension 230 may include an inboard length 242*a* and an outboard length 242*b*. When affixed to the tip end 204 of ducted rotor blade 200, multi-material tip extension 230 may extend the overall length of ducted rotor blade 200 such that the ducted rotor blade has a fixed extended length 212*b* as measured between the outboard end 234 of multi-material tip extension 230 and the inboard end 202 of ducted rotor blade 200. It is to be understood that the fixed extended length that may be provided for a ducted rotor blade by a multi-material tip extension may depend on techniques, structures, features, etc. of the multi-material tip extension and/or the ducted rotor blade that may be used to affix the multi-material tip extension to the ducted rotor blade.

The fixed extended length 212*b* of ducted rotor blade 200 may provide a clearance distance (or gap) 216 between the outboard end 234 of multi-material tip extension 230 and inner face 222*a* of rotor duct 220. Clearance distance 216 may depend on application and/or implementation based on the clearance distance (gap) to chord length ratio designed for the ducted rotor system 280. In some embodiments, clearance distance 216 may be less than one inch. In still some embodiments, clearance distance 216 may be less than 0.5 inches.

In general, an airfoil (sometimes referred to as airfoil shape) is the cross-sectional shape of a wing or rotor blade. The cross-sectional shape of any exposed portion of a multi-material tip extension (e.g., outboard end 234 of multi-material tip extension 230 not inserted into the tip end 204 of ducted rotor blade 200) may be the same as the cross-sectional shape of the tip end of the ducted rotor blade to which the multi-material tip extension is attached. For example, outboard end 234 of multi-material tip extension 230 may have an airfoil shape that is the same as the airfoil shape of the tip end 204 of ducted rotor blade 200 such that multi-material tip extension 230 may have aerodynamic characteristics (e.g., lift, drag, etc.) that are similar to aerodynamic characteristics of the tip end 204 of ducted rotor blade 200. The cross-sectional (airfoil) shape of multi-material tip extension 230 is further illustrated in FIG. 2C.

As illustrated in FIG. 2C, multi-material tip extension 230 may have a top surface 243 and a bottom surface 244. Respective top surface 243 and bottom surface 244 of multi-material tip extension 230 may be at a same level as the respective top surface and bottom surface (not labeled) of ducted rotor blade 200. In at least one embodiment, flexible elements 235 may be formed for the outboard end 234 of multi-material tip extension 230 by providing a plurality of cuts, incisions, bristles, or the like at the outboard end 234 that extend linearly from top surface 243 to bottom surface 244 and to a length 237 that extends inward from the outboard end 233 toward the inboard end 232 of the multi-material tip extension 230. Flexible elements 235 may be linear between the top surface 243 and the bottom surface 244 of multi-material tip extension 230 for the embodiments of FIGS. 2A-2D.

In general, cuts used to form flexible elements 235 may have an orientation such that unintended contacts that may occur between multi-material tip extension 230 and rotor duct 220 can be absorbed along the motion of rotation (251) of ducted rotor blade 200. In some embodiments, cuts may be approximately parallel with the rotation axis of a ducted rotor blade; however, in other embodiments, cuts may be provided at a theta (θ) offset angle in order to accommodate different pitch angles of ducted rotor blades, as discussed in further detail below. In still other embodiments, curved cuts may be utilized in order to form flexible elements that are curved between the top surface and the bottom surface of multi-material tip extensions. In still some embodiments, any combination of straight and curved cuts may be utilized to form flexible elements for multi-material tip extensions described herein. In still other embodiments, one or any combination of features such as straight cuts, curved cuts, angled cuts, bristles, and/or a hollow perimeter may be utilized to form flexible elements for multi-material tip extensions described herein.

Length 237 of flexible elements 235 may be less than outboard length 242*b* of multi-material tip extension 230. Flexible elements 235 may have a width 239. In some embodiments, flexible elements 235 may have a uniform width 239 along chord length 214; however, in other embodiments, flexible elements 235 may have varying width 239 along chord length 214.

As noted above, ducted rotor blade 200 may have different alpha (α) pitch angles as it is rotated (251) around the mast axis during operation. In order to maintain ducted effectiveness of ducted rotor blade 200 during operation of ducted rotor system 280, it is important to minimize the amount of air that may pass through flexible elements 235 (e.g., from the bottom side of the tip extension up through the flexible elements and out the top side) during instances in which unintended contact(s) may occur between multi-material tip extension 230 and rotor duct 220.

In some embodiments, flexible elements 235 may be provided for the outboard end 234 of multi-material tip extension 230 at a theta (θ) offset angle relative to a horizontal axis 215 (that is oriented parallel with the chord length 214) such that the θ offset angle may accommodate the potential range of a pitch angles of the ducted rotor blade 200 in order to limit air from passing between the flexible elements 235 for instances in which multi-material tip extension 230 may contact the inner face 222*a* of rotor duct 220 during rotations. For example, for the embodiment of FIGS. 2A-2D, if an unintended contact occurs between multi-material tip extension 230 and the inner face 222*a* during a cycle of rotation as the leading edge 236 of ducted rotor blade 200 is pitched downward, the θ offset angle of flexible elements 235 may limit air from passing through the multi-material tip extension 230.

An example use case scenario illustrating features associated with flexible elements 235 is illustrated in FIG. 2D in which the leading edge 236 of ducted rotor blade may be tilted downward at a given a pitch angle during a cycle of rotation (251) and an unintended contact may occur between multi-material tip extension 230 and rotor duct 220. As illustrated in the example use case scenario of FIG. 2D, for instances in which an unintended contact may occur between multi-material tip extension 230 and rotor duct 220, contact energy may be absorbed by flexible elements 235 causing them to deform. During such contact, air (as generally indicated by dashed-line arrows 290) may be deflected along the bottom side 244 of the multi-material tip extension 230 rather than passing through the deformed flexible elements 235; thereby, helping to maintain ducted effectiveness of the ducted rotor system 280 while also limiting contact loads from being transferred into the rotor duct 220 and/or ducted rotor blade 200, which may minimize damage to the rotor duct and/or the ducted rotor blade during such unintended contacts.

In at least one embodiment, the length 237 of cuts (and/or bristles) that may be used to form flexible elements 235 may be based on the clearance distance 216 that is to be provided for a particular implementation and/or application and/or the amount of expected contact that may need to be absorbed for different operating conditions. For example, a longer length 237 may be utilized if the clearance distance 216 is to be small and/or the contact to be absorbed is expected to be large while a shorter length 237 may be utilized if the clearance distance 216 is to be large and/or the contact to be absorbed is expected to be small.

Although the embodiments of FIGS. 2A-2D illustrate flexible elements 235 that are linear between the top surface 243 and the bottom surface 244 of multi-material tip extension 230, flexible elements of multi-material tip extensions may have other shapes, in accordance with embodiments of the present disclosure, as discussed below in FIG. 3.

Embodiments described herein involve single-piece multi-material blade tip extensions that may have better retention on the blades and be produced in higher quantity at lower cost as compared to multi-piece blade tips, in which outboard and inboard pieces are manufactured separately and subsequently joined together. In accordance with features of embodiments described herein, a single-piece multi-material blade tip extension could be manufactured by 3-D printing techniques using two materials. Alternatively, injection molding techniques could be used, in which case either the structural or the compliant component is premade and placed into a mold and the other material is injected atop the premade component. A premade structural piece may be made from metallic or composite materials, as well as injectable materials. In another version of injection molding, referred to as "over-molding," the material for the first component could be injected into the mold in a first step and the material for the second component injected thereafter in a second step.

Figure 3:
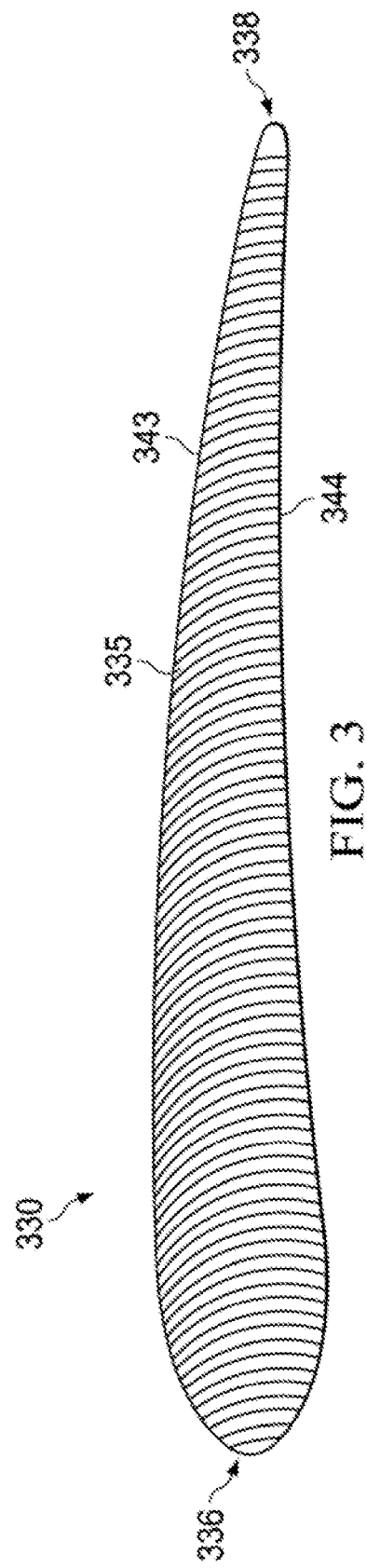
FIG. 3 is a simplified side view diagram illustrating example details that may be associated with another multi-material tip extension for a ducted rotor blade, in accordance with certain embodiments.

Referring to FIG. 3, FIG. 3 is a simplified side view diagram illustrating example details that may be associated with another multi-material tip extension 330, in accordance with certain embodiments. In at least one embodiment, multi-material tip extension 330 may include a leading edge 336, a trailing edge 338, a top surface 343, a bottom surface 344, and a plurality of flexible elements 335. For the embodiment of FIG. 3, flexible elements 335 may be curved between the top surface 343 and the bottom surface 344 of multi-material tip extension 330.

Figure 4A:
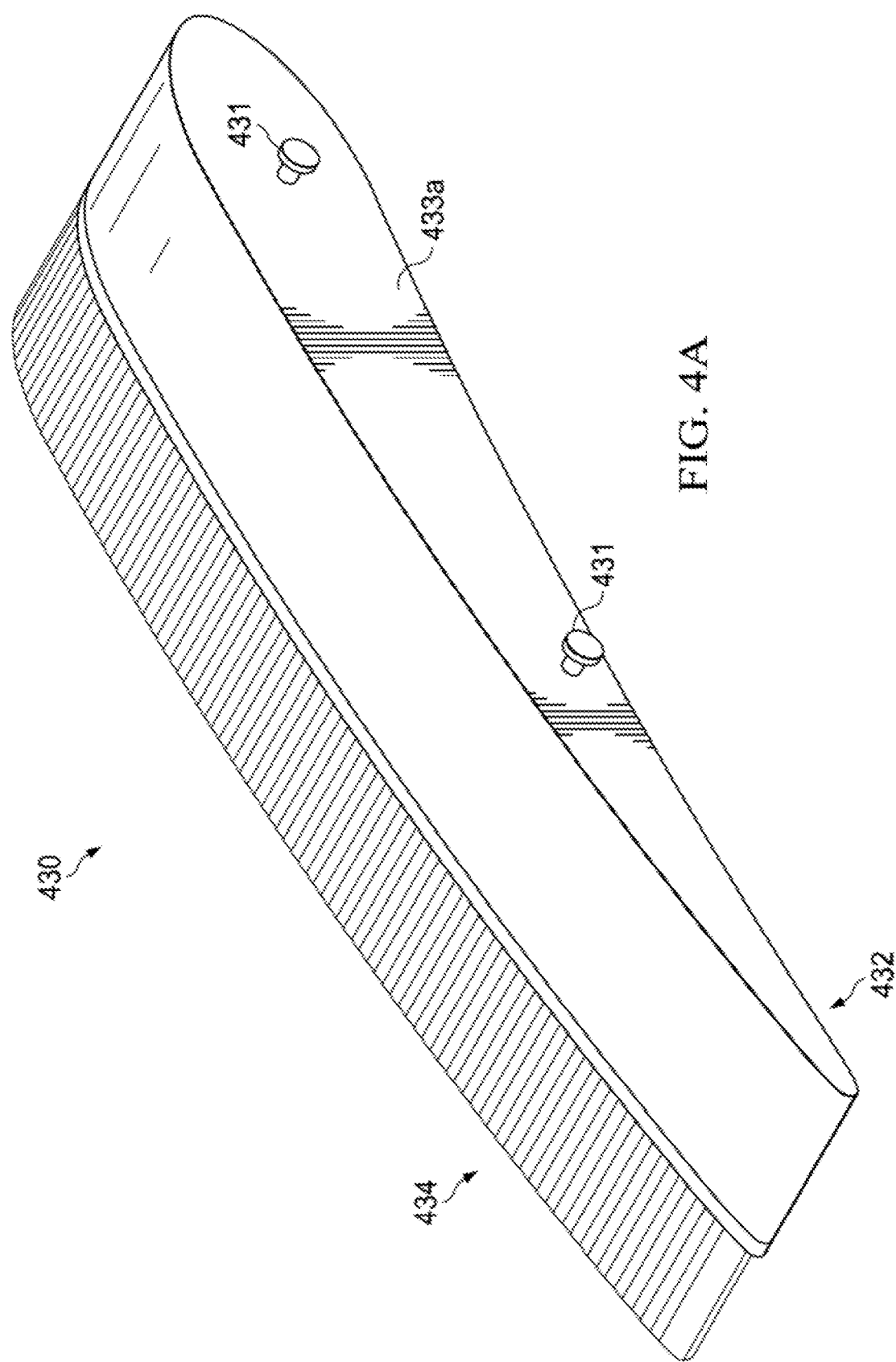
FIGS. 4A-4C are simplified diagrams illustrating example details that may be associated with another multi-material tip extension for a ducted rotor blade, in accordance with certain embodiments.
Figure 4B:
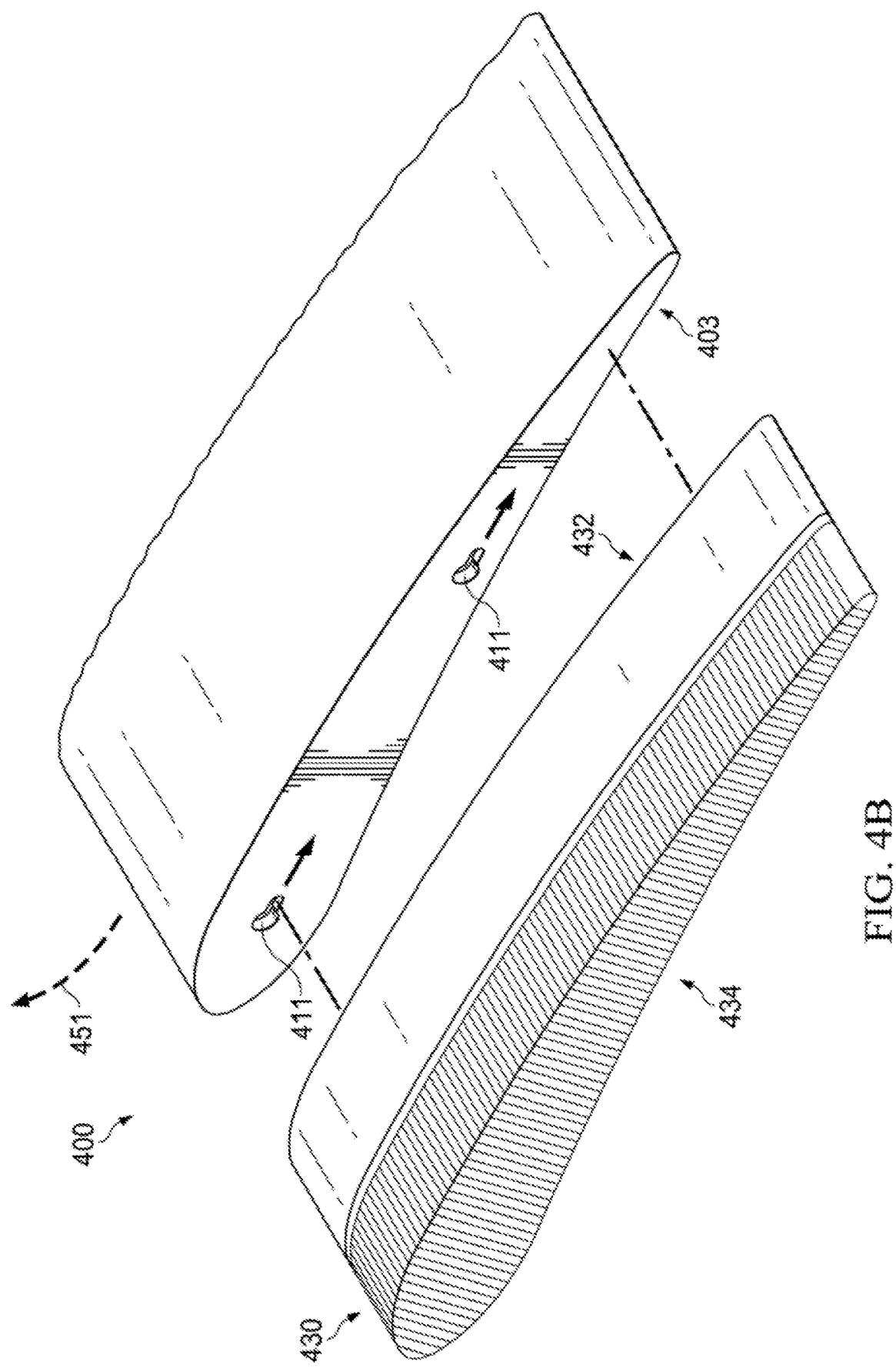
Figure 4C:
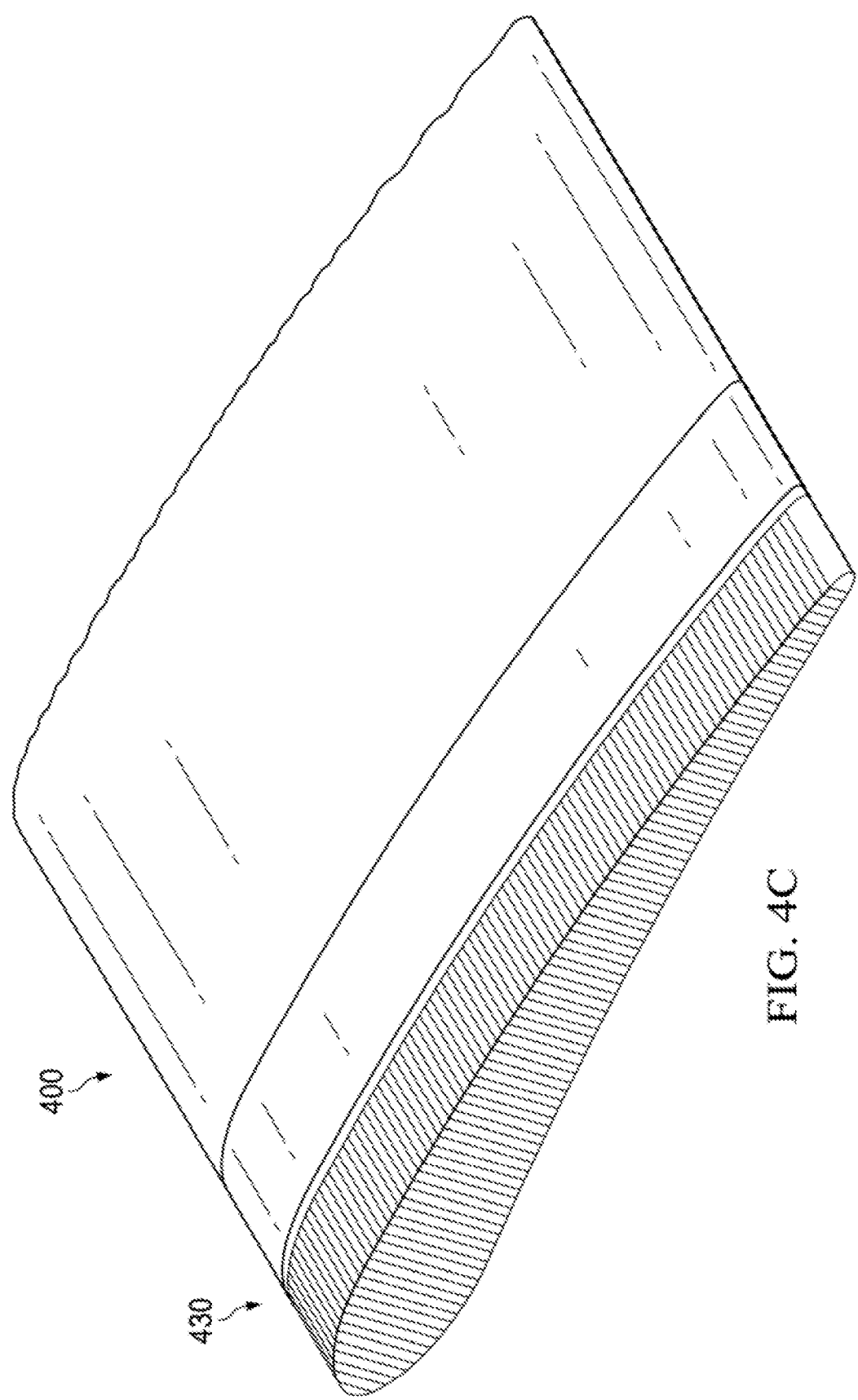

Referring to FIGS. 4A-4C, FIGS. 4A-4C are simplified perspective view diagrams illustrating example details that may be associated with another multi-material tip extension 430 for a ducted rotor blade 400, in accordance with certain embodiments. In at least one embodiment, as illustrated in FIG. 4A, multi-material tip extension may include an inboard end 432 made of a non-flexible material and an outboard end 434 made of a non-flexible material. Outboard end 434 may include a plurality of flexible elements 435. In various embodiments, flexible elements 435 may include any combination of features (e.g., straight cuts, curved cuts, angled cuts, bristles, a hollow perimeter, etc.) discussed for any other flexible elements described herein.

As illustrated in FIG. 4A, one or more attachment element (s) 431 may be configured for the inboard face 433a of inboard end 432. The one or more attachment element(s) 431 may be configured to facilitate affixing multi-material tip extension 430 to ducted rotor blade 400. For the embodiment of FIGS. 4A-4C, attachment element(s) 431 may be post or stud structures configured for the inboard face 433a of inboard end 432.

As illustrated in FIG. 4B, mating attachment element(s) 411 (e.g., interlocking slots) may be provided for a tip end 404 of ducted rotor blade 400 to facilitate affixing multi-material tip extension 430 to the tip end 404 of the ducted rotor blade 400. In at least one embodiment, attachment element(s) 431 provided for multi-material tip extension 430 and mating attachment element(s) 411 provided for tip end 404 of ducted rotor blade 400 may include features that provide for improved mechanical attachment between multi-material tip extension 430 and ducted rotor blade 400 based on the expected direction of rotation (e.g., generally indicated by dashed-line arrow 451) for the ducted rotor blade 400. For example, posts provided for a multi-material tip extension and interlocking slots provided for a rotor blade tip end may be configured such that the posts and slots interlock together based on the expected direction of rotation for the rotor blade during operation. The assembled ducted rotor blade 400 including multi-material tip extension 430 is illustrated in FIG. 4C.

The example attachment techniques, multi-material tip extension features, and/or rotor blade features discussed herein for affixing a multi-material tip extension to a rotor blade are only a few of the many means or methods that may be used to mechanically affix a multi-material tip extension to a rotor blade and are not meant to limit the broad scope of the present disclosure. Virtually any other means or methods may be used to mechanically affix a multi-material tip extension to a ducted rotor blade for a ducted rotor system and, thus, are clearly within the scope of the present disclosure.

Figure 5A:
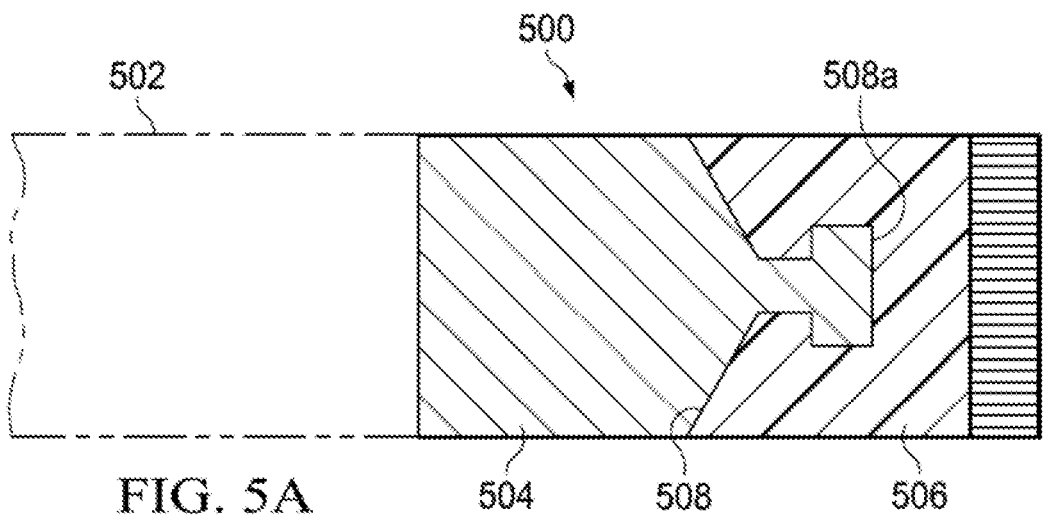
FIG. 5A is a simplified cutaway view illustrating example details that may be associated with another multi-material tip extension for a ducted rotor blade, in accordance with certain embodiments.

Turning now to FIG. 5A, illustrated therein is a simplified cutaway view illustrating example details that may be associated with a multi-material tip extension 500 for a ducted rotor blade 502, in accordance with certain embodiments. As shown in FIG. 5A, multi-material tip extension 500 includes a structural portion 504 and a compliant portion 506. A transition between structural portion 504 and compliant portion 506 comprises a joint 508, which in the illustrated embodiment includes a feature 508a for providing an interlocking mechanism and increasing the amount of shear area between the structural portion 504 and compliant portion 506 along the joint 508.

Figure 5B:
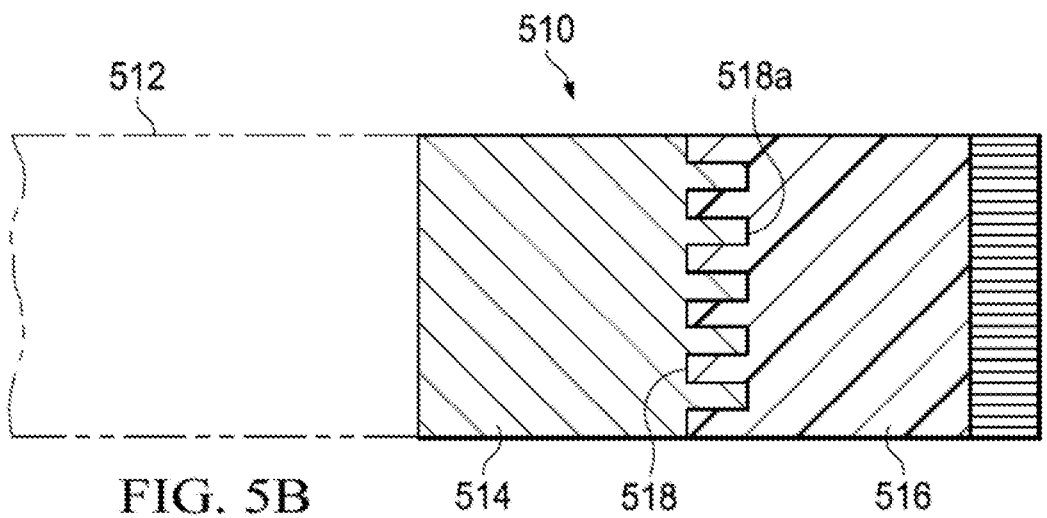
FIG. 5B is a simplified cutaway view illustrating example details that may be associated with another multi-material tip extension for a ducted rotor blade, in accordance with certain embodiments.

Turning now to FIG. 5B, illustrated therein is a simplified cutaway view illustrating example details that may be associated with a multi-material tip extension 510 for a ducted rotor blade 512, in accordance with certain embodiments. As shown in FIG. 5B, multi-material tip extension 510 includes a structural portion 514 and a compliant portion 516. A transition between structural portion 514 and compliant portion 516 comprises a joint 518, which in the illustrated embodiment includes a plurality of features, such as a feature 508a, for providing an interlocking mechanism and increasing the amount of shear area between the structural portion 514 and compliant portion 516 along the joint 518.

Figure 5C:
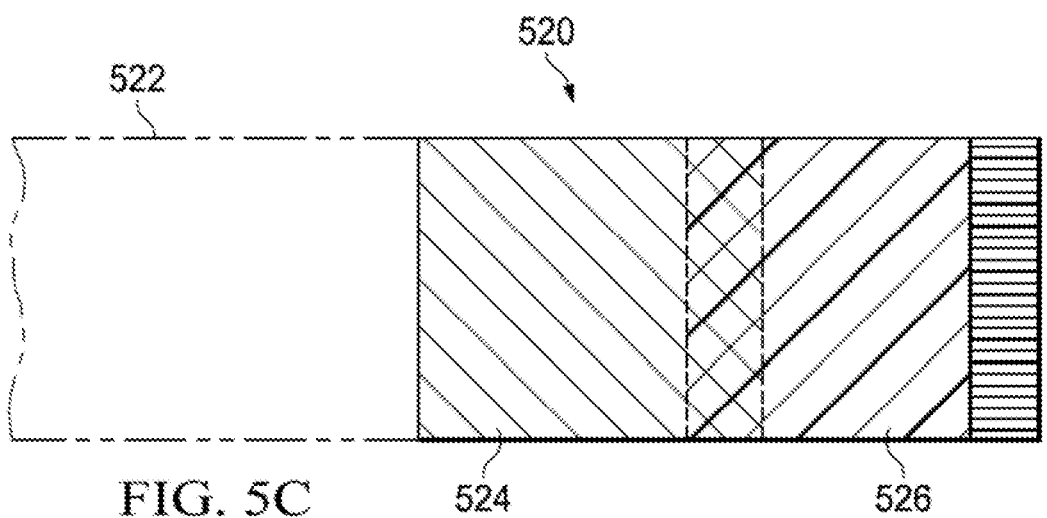
FIG. 5C is a simplified cutaway view illustrating example details that may be associated with another multi-material tip extension for a ducted rotor blade, in accordance with certain embodiments.

Turning now to FIG. 5C, illustrated therein is a simplified cutaway view illustrating example details that may be associated with a multi-material tip extension 520 for a ducted rotor blade 522, in accordance with certain embodiments. As shown in FIG. 5C, multi-material tip extension 520 includes a structural portion 524 and a compliant portion 526. In the embodiment shown in FIG. 5C, a transition between structural portion 524 and compliant portion 516 comprises a gradual transition 528 from one material to the other.

Figure 6:
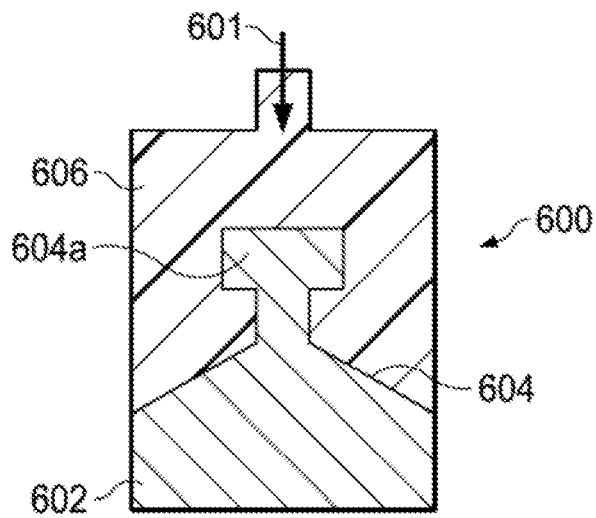
FIG. 6 is a simplified diagram illustrating example details of a mold that may be associated with forming a multi-material tip extension for a ducted rotor blade, in accordance with certain embodiments.

FIG. 6 is a simplified diagram illustrating an example injection mold 600 that may be associated with forming a multi-material tip extension for a ducted rotor blade, in accordance with certain embodiments. As shown in FIG. 6, in accordance with features of certain embodiments described herein, a first material may be injected into the mold 600, as represented by an arrow 601, for forming a first portion (e.g., a structural portion) 602 of the multi-material tip extension using appropriate injection molding techniques and additional mold elements (e.g., an interior divider for forming a top surface 604 of first portion 602, which may include an interlocking feature, such as a feature 604a). Alternatively, the first portion 602 may be formed in a separate mold and introduced into the mold 600 in prefabricated form.

After the first portion 602 has been formed in or introduced into the bottom of the mold 600, a second material may be injected into the mold 600, as represented by the arrow 601, for forming a second portion (e.g., a compliant portion) 606 of the multi-material tip extension using appropriate injection molding techniques. The top surface 604 of the first portion 602 adjoins the bottom surface of the second portion 606 and functions as a joint therebetween. The result of this process is a unitary multi-material tip extension for a ducted rotor blade.

It will be recognized that, although as shown in FIG. 6, the first portion 602 is formed of structural material and the second portion 606 is formed of compliant material, the process may be performed in reverse, with the first portion 602 being formed of compliant material and the second portion 606 being formed of structural material.

Figure 7:
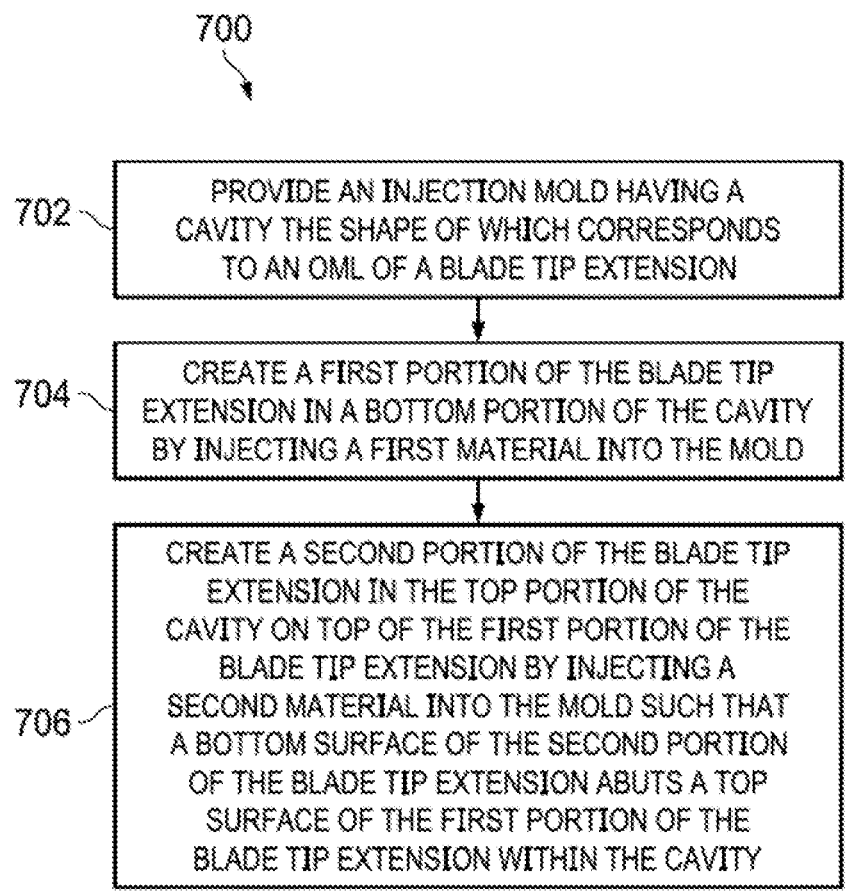
FIGS. 7 and 8 are simplified flowcharts illustrating example details that may be associated with forming a multi-material tip extension for a ducted rotor blade, in accordance with certain embodiments.

FIG. 7 is a simplified flowchart 700 illustrating example details that may be associated with forming a multi-material tip extension for a ducted rotor blade, in accordance with one embodiment. In step 702, an injection mold having a cavity the shape of which corresponds to an outer mold line (OML) of a multi-material rotor blade tip extension is provided. In step 704, a first portion of the multi-material blade tip extension is created in a bottom portion of the mold cavity by injecting a first material into the mold.

In step 706, a second portion of the multi-material blade tip extension is created in the top portion of the cavity on top of the first portion of the multi-material blade tip extension by injecting a second material into the mold such that a bottom surface of the second portion of the blade tip extension interfaces with and connects to a top surface of the first portion of the blade tip extension within the cavity.

Figure 8:
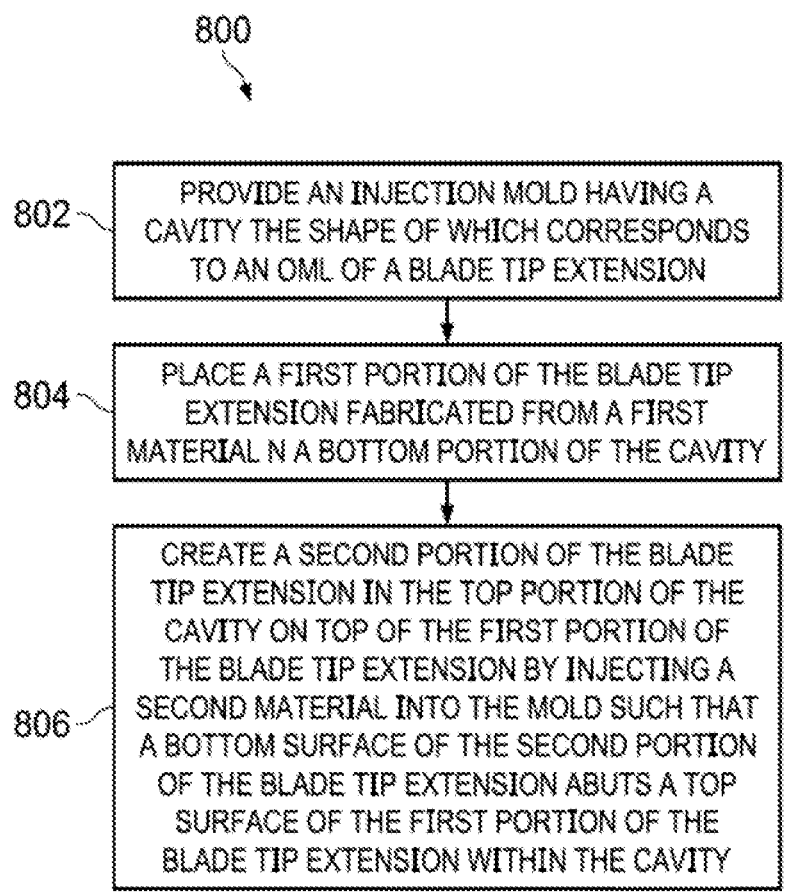

FIG. 8 is a simplified flowchart 800 illustrating example details that may be associated with forming a multi-material tip extension for a ducted rotor blade, in accordance with another embodiment. In step 802, an injection mold having a cavity the shape of which corresponds to an outer mold line (OML) of a multi-material blade tip extension is provided. In step 804, a pre-made first portion of the multi-material blade tip extension fabricated from a first material is placed in a bottom portion of the mold cavity.

In step 806, a second portion of the multi-material blade tip extension is created in the top portion of the cavity on top of the first portion of the multi-material blade tip extension by injecting a second material into the mold such that a bottom surface of the second portion of the multi-material blade tip extension interfaces with and connects to a top surface of the first portion of the blade tip extension within the cavity.

It will be recognized that a multi-material blade tip extension in accordance with features of embodiments described herein may be fabricated in methods other than those described in connection with flowcharts 700 and 800, including, for example, using 3-dimensional printing techniques with multiple materials.

Example 1 is a rotor system including a rotor duct; at least one rotor blade, wherein the at least one rotor blade comprises a tip end; and a multi-material tip extension affixed at the tip end of the at least one rotor blade, wherein the multi-material tip extension comprises an inboard portion fabricated from a first material and an outboard portion fabricated from a second material, wherein the second material is different than the first material.

In Example 2, the rotor system of Example 1 may further include the first material comprising a structural material.

In Example 3, the rotor system of any of Examples 1-2 may further include the structural material comprising at least one of a composite material, a reinforced composite material, fiberglass, reinforced fiberglass, plastic, reinforced plastic, a metal, and a metal alloy.

In Example 4, the rotor system of any of Examples 1-3 may further include the second material comprising a compliant material.

In Example 5, the rotor system of any of Examples 1-4 may further include the compliant material comprising at least one of an elastomer, silicon rubber, nylon, polyester, and polypropylene.

In Example 6, the rotor system of any of Examples 1-5 may further include the multi-material tip extension wherein an inboard end surface of the outboard portion adjoins an outboard end surface of the inboard portion to form a joint.

In Example 7, the rotor system of any of Examples 1-6 may further include the joint comprising at least one interlocking feature for increasing a shear area of the joint.

In Example 8, the rotor system of any of Examples 1-7 may further include an interface between the inboard portion and the outboard portion comprising a gradual transition from the first material to the second material.

In Example 9, the rotor system of any of Example 1-8 may further include the multi-material tip extension providing a clearance distance between the tip extension and the rotor duct.

Example 10 is an aircraft including a fuselage; and at least one rotor system, the at least one rotor system comprising a rotor duct; at least one rotor blade, wherein the at least one rotor blade comprises a tip end; and a multi-material tip extension affixed at the tip end of the at least one rotor blade, wherein the multi-material tip extension comprises an inboard portion fabricated from a first material and an outboard portion fabricated from a second material, wherein the second material is different than the first material.

In Example 11, the aircraft of Example 10 may further include the first material comprising a structural material.

In Example 12, the aircraft of any of Examples 10-11 may further include the structural material comprising at least one of a composite material, a reinforced composite material, fiberglass, reinforced fiberglass, plastic, reinforced plastic, a metal, and a metal alloy.

In Example 13, the aircraft of any of Examples 10-12 may further include the second material comprising a compliant material.

In Example 14, the aircraft of any of Examples 10-13 may further include the compliant material comprising at least one of an elastomer, silicon rubber, nylon, polyester, and polypropylene.

In Example 15, the aircraft of any of Examples 10-14 may further include the multi-material tip extension wherein an inboard end surface of the outboard portion adjoins an outboard end surface of the inboard portion to form a joint.

In Example 16, the aircraft of any of Examples 10-15 may further include the joint comprising at least one interlocking feature for increasing a shear area of the joint.

In Example 17, the aircraft of any of Examples 10-16 may further include an interface between the inboard portion and the outboard portion comprising a gradual transition from the first material to the second material.

Example 18 is a method comprising providing a mold, wherein the mold comprises a cavity and the cavity has a shape that matches an outer mold line of a rotor blade; providing a first material in a bottom of the cavity, the first material comprising a first portion of a unitary blade tip extension for the rotor blade; and injecting a second material into the cavity on top of the first material to form a second portion of the unitary blade tip extension for the rotor blade; wherein one of the first and second materials comprises a structural material and the other one of the first and second materials comprises a compliant material.

In Example 19, the method of Example 18 further includes the providing the first material in the bottom of the cavity comprising injecting the first material into the cavity.

In Example 20, the method of any of Examples 18-19 further includes the providing the first material in the bottom of the cavity comprising fabricating the first portion; and placing the fabricated first portion in the bottom of the cavity.

The flowcharts diagrams in the FIGURES illustrate the architecture, functionality, and/or operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system comprising:
 a rotor duct;
 at least one rotor blade, wherein the at least one rotor blade comprises a tip end; and
 a multi-material tip extension affixed at the tip end of the at least one rotor blade, wherein the multi-material tip extension comprises an inboard portion fabricated from a first material and an outboard portion fabricated from a second material, wherein the second material is different than the first material;
 wherein an inboard-facing surface of the inboard portion comprises a first attachment element configured to mate with a complementary second attachment element on an outboard-facing surface of the tip end of the at least one rotor blade to secure the multi-material tip extension to at the tip end;
 wherein the first material is a non-flexible material and the second material is a flexible material;
 wherein the outboard portion comprises a plurality of flexible elements extending outboard from the inboard portion; and
 wherein the multi-material tip extension covers an entirety of an outboard surface of the tip end.

2. The rotor system of claim 1, wherein the first material comprises at least one of a composite material, a reinforced composite material, fiberglass, reinforced fiberglass, plastic, reinforced plastic, a metal, and a metal alloy.

3. The rotor system of claim 1, wherein the second material comprises at least one of an elastomer, silicon rubber, nylon, polyester, and polypropylene.

4. The rotor system of claim 1, wherein an inboard end surface of the outboard portion adjoins an outboard end surface of the inboard portion to form a joint.

5. The rotor system of claim 4, wherein the joint includes at least one interlocking feature for increasing a shear area of the joint.

6. The rotor system of claim 1, wherein an interface between the inboard portion and the outboard portion comprises a gradual transition from the first material to the second material.

7. The rotor system of claim 1, wherein the multi-material tip extension provides a clearance distance between the multi-material tip extension and the rotor duct.

8. The rotor system of claim 1, wherein each of the plurality of flexible elements is positioned such that an axis that extends perpendicular to a width of the flexible element forms a non-zero offset angle with an axis corresponding to a chord length of the tip end.

9. An aircraft comprising:
 a fuselage; and
 at least one rotor system, the at least one rotor system comprising:
  a rotor duct;
  at least one rotor blade, wherein the at least one rotor blade comprises a tip end; and
  a multi-material tip extension affixed at the tip end of the at least one rotor blade, wherein the multi-material tip extension comprises an inboard portion fabricated from a first material and an outboard portion fabricated from a second material, wherein the second material is different than the first material;
 wherein an inboard-facing surface of the inboard portion comprises a first attachment element configured to mate with a complementary second attachment element on an outboard-facing surface of the tip end of the at least one rotor blade to secure the multi-material tip extension to at the tip end;
 wherein the first material is a non-flexible material and the second material is a flexible material;
 wherein the outboard portion comprises a plurality of flexible elements extending outboard from the inboard portion; and
 wherein the multi-material tip extension covers an entirety of an outboard surface of the tip end.

10. The aircraft of claim 9, wherein the first material comprises a structural material.

11. The aircraft of claim 10, wherein the structural material comprises at least one of a composite material, a reinforced composite material, fiberglass, reinforced fiberglass, plastic, reinforced plastic, a metal, and a metal alloy.

12. The aircraft of claim 9, wherein the second material comprises a compliant material.

13. The aircraft of claim 12, wherein the compliant material comprises at least one of an elastomer, silicon rubber, nylon, polyester, and polypropylene.

14. The aircraft of claim 9, wherein an inboard end surface of the outboard portion adjoins an outboard end surface of the inboard portion to form a joint.

15. The aircraft of claim 14, wherein the joint includes at least one interlocking feature for increasing a shear area of the joint.

16. The aircraft of claim 9, wherein an interface between the inboard portion and the outboard portion comprises a gradual transition from the first material to the second material.

* * * * *

UNITED STATES PATENT AND TRADEMARK OFFICE
CERTIFICATE OF CORRECTION

| | | |
|---|---|---|
| PATENT NO. | : 12,365,453 B2 | Page 1 of 1 |
| APPLICATION NO. | : 17/229831 | |
| DATED | : July 22, 2025 | |
| INVENTOR(S) | : George Matthew Thompson et al. | |

It is certified that error appears in the above-identified patent and that said Letters Patent is hereby corrected as shown below:

In the Claims

In Column 15, Claim 1, Line 17, replace "at the tip end;" with --the tip end;--.

In Column 16, Claim 9, Line 19, replace "at the tip end;" with --the tip end;--.

Signed and Sealed this
Thirtieth Day of September, 2025

John A. Squires
*Director of the United States Patent and Trademark Office*